(12) United States Patent
Reineke et al.

(10) Patent No.: US 11,860,943 B2
(45) Date of Patent: Jan. 2, 2024

(54) METHOD OF "OUTCOME DRIVEN DATA EXPLORATION" FOR DATASETS, BUSINESS QUESTIONS, AND PIPELINES BASED ON SIMILARITY MAPPING OF BUSINESS NEEDS AND ASSET USE OVERLAP

(71) Applicant: EMC IP Holding Company LLC, Hopkinton, MA (US)

(72) Inventors: Nicole Reineke, Northborough, MA (US); Hanna Yehuda, Newton, MA (US); Stephen J. Todd, North Andover, MA (US); Aurelian Dumitru, Round Rock, TX (US); Donagh A. Buckley, Banteer (IE)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 1 day.

(21) Appl. No.: 17/107,358

(22) Filed: Nov. 30, 2020

(65) Prior Publication Data
US 2022/0164393 A1 May 26, 2022

Related U.S. Application Data

(63) Continuation-in-part of application No. 17/104,518, filed on Nov. 25, 2020.

(51) Int. Cl.
*G06F 16/9032* (2019.01)
*G06F 16/907* (2019.01)
(Continued)

(52) U.S. Cl.
CPC ...... *G06F 16/90324* (2019.01); *G06F 16/907* (2019.01); *G06F 16/9035* (2019.01); *G06F 16/9038* (2019.01)

(58) Field of Classification Search
CPC ............ G06F 16/90324; G06F 16/907; G06F 16/9038; G06F 16/9035
See application file for complete search history.

(56) References Cited

U.S. PATENT DOCUMENTS

| | | | | |
|---|---|---|---|---|
| 6,028,601 A | * | 2/2000 | Machiraju | ............... G06F 40/30 707/999.005 |
| 6,285,998 B1 | * | 9/2001 | Black | ................... G06F 16/2423 715/810 |

(Continued)

FOREIGN PATENT DOCUMENTS

EP    3534272 A1    9/2019

OTHER PUBLICATIONS

D. Song et al., "Building and Querying an Enterprise Knowledge Graph," in IEEE Transactions on Services Computing, vol. 12, No. 3, pp. 356-369, 1 May-Jun. 2019, doi: 10.1109/TSC.2017.2711600. (Year: 2019).

*Primary Examiner* — Robert W Beausoliel, Jr.
*Assistant Examiner* — Susan F Rayyan
(74) *Attorney, Agent, or Firm* — Workman Nydegger

(57) ABSTRACT

One example method includes receiving a query that recites a particular question for which a user who originated the query needs an answer, parsing the query to identify the question, identifying information that is responsive to the question, presenting the information to the user in a user-selectable form, and receiving, from the user, a selection of the information. In some cases, the information presented to the user may include one or more datasets, or one or more pipelines.

20 Claims, 4 Drawing Sheets

(51) Int. Cl.
*G06F 16/9038* (2019.01)
*G06F 16/9035* (2019.01)

(56) References Cited

U.S. PATENT DOCUMENTS

| | | | | |
|---|---|---|---|---|
| 7,509,313 | B2 * | 3/2009 | Colledge | G06F 40/247 |
| | | | | 707/999.005 |
| 7,519,529 | B1 * | 4/2009 | Horvitz | G06F 40/35 |
| | | | | 369/30.04 |
| 8,898,200 | B2 * | 11/2014 | Shridhar | G06F 16/2462 |
| | | | | 707/802 |
| 9,477,782 | B2 * | 10/2016 | Marantz | G06F 16/2423 |
| 10,360,265 | B1 * | 7/2019 | Agarwal | G10L 15/1815 |
| 10,929,392 | B1 * | 2/2021 | Cheng | G06N 3/08 |
| 11,200,283 | B2 | 12/2021 | Mujumdar et al. | |
| 11,238,049 | B1 * | 2/2022 | James | G06F 16/24573 |
| 11,238,102 | B1 * | 2/2022 | Lisuk | G06F 40/279 |
| 11,386,158 | B1 * | 7/2022 | Bourbie | G06F 16/9035 |
| 11,410,106 | B2 * | 8/2022 | Brannon | G06F 21/577 |
| 11,481,710 | B2 * | 10/2022 | Brannon | G06F 21/552 |
| 2009/0055417 | A1 * | 2/2009 | Hannuksela | G06F 16/7867 |
| 2014/0358910 | A1 * | 12/2014 | Frigon | G06F 16/9038 |
| | | | | 707/723 |
| 2015/0293901 | A1 * | 10/2015 | Bufe, III | G06F 40/30 |
| | | | | 707/725 |
| 2016/0125751 | A1 * | 5/2016 | Barker | G06F 16/9535 |
| | | | | 434/322 |
| 2016/0180242 | A1 * | 6/2016 | Byron | G06N 5/041 |
| | | | | 706/11 |
| 2016/0371395 | A1 * | 12/2016 | Dumant | G06F 16/90324 |
| 2019/0155954 | A1 * | 5/2019 | Goyal | G06F 16/9038 |
| 2019/0197605 | A1 * | 6/2019 | Sadler | G06F 16/90335 |
| 2019/0272296 | A1 | 9/2019 | Prakash et al. | |
| 2020/0042626 | A1 * | 2/2020 | Curtis | G06F 16/25 |
| 2020/0097598 | A1 * | 3/2020 | Anderson | G10L 15/22 |
| 2021/0064620 | A1 * | 3/2021 | Namaki | G06F 16/90328 |
| 2021/0182283 | A1 * | 6/2021 | Carney | G06F 16/248 |
| 2021/0271983 | A1 * | 9/2021 | Mohanty | G06F 16/24522 |
| 2021/0326742 | A1 * | 10/2021 | Rosset | G06N 5/04 |
| 2021/0382946 | A1 * | 12/2021 | Beller | G06F 16/906 |

* cited by examiner

METHOD OF "OUTCOME DRIVEN DATA EXPLORATION" FOR DATASETS, BUSINESS QUESTIONS, AND PIPELINES BASED ON SIMILARITY MAPPING OF BUSINESS NEEDS AND ASSET USE OVERLAP

FIELD OF THE INVENTION

Embodiments of the present invention generally relate to discovery of datasets. More particularly, at least some embodiments of the invention relate to systems, hardware, software, computer-readable media, and methods for question based generation of datasets.

BACKGROUND

Current methods of enabling business users to access and discover data are typically limited to the ability to search on known labels or tags that have been applied to the data, and require the business user to be fully aware of the probable categorization of data. This is inefficient and results in the loss of data exploration opportunities. These types of approaches are also likely to produce less relevant data, which may adversely affect any decisions that are taken based on that data.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
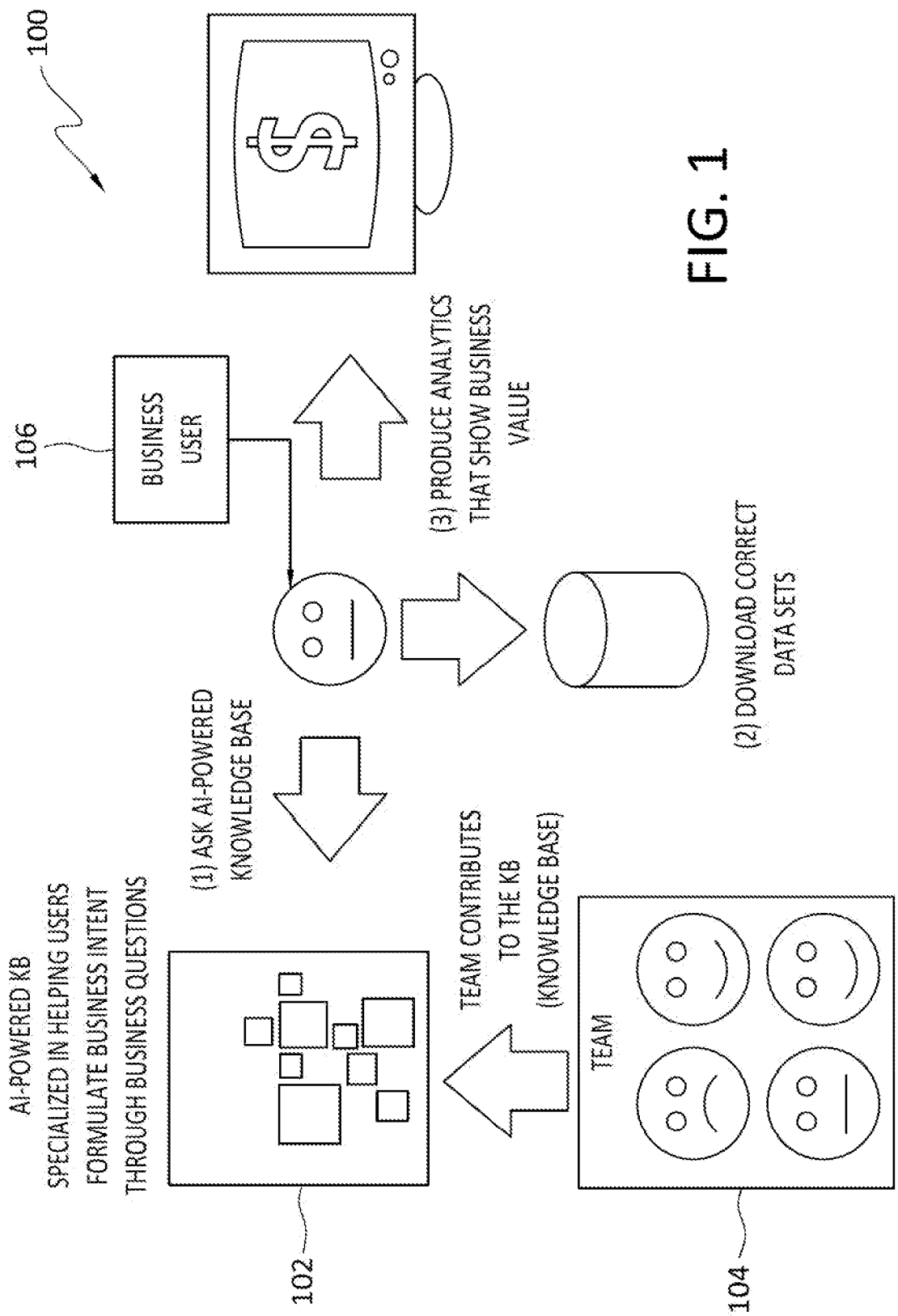
FIG. 1 discloses aspects of a high level architecture of some embodiments of the invention.

Embodiments of the present invention generally relate to discovery of datasets. More particularly, at least some embodiments of the invention relate to systems, hardware, software, computer-readable media, and methods for question based generation of datasets.

In general, at least some example embodiments of the invention involve dataset generation processes in which a user seeking to obtain a dataset specifies, as part of the data query, the question that the user is trying to answer, or the problem the user is trying to solve. This approach may be advantageous over conventional approaches in which the problem that the user is seeking to solve is only implicitly embodied, if at all, in the query made by the user. That is, in these conventional approaches, the user query is typically limited to requesting data that the user believes will enable the user to solve the problem, but the query does not identify the actual problem itself.

By providing a query that comprises, or consists of, the problem that the user is trying to solve, example embodiments may bring the power of the data management system to bear by identifying the data that may be best suited to solve the problem that was specified by the user, thus partially, or completely, relieving the user of the burden of having to figure out which data is needed. Thus, a query process in accordance with embodiments of the invention may be greatly simplified relative to conventional processes.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that the user need not be aware of how data is categorized or labeled in order to obtain a dataset, or datasets, that may be effective in resolving a problem that the user has identified. Some embodiments may provide for an efficient and effective query process insofar as those embodiments may employ historical information, such as other problems and datasets, in identifying and returning data that may be effective in resolving one or more problems. Some embodiments may provide for a simplified query process in which a user may have to specify little, or no, more than the problem that the user is trying to solve in order to obtain the needed dataset. Some embodiments may relieve the user of the burden of having to figure out which data may be useful in solving a problem, and may instead transfer that burden to the data management system. Some embodiments may provide guidance to a user by suggesting queries and/or datasets that may be useful to the user.

A. Overview

Example embodiments of the invention may involve what can be referred to as outcome driven data exploration. Such data exploration may be enabled, at least in part, through the creation and use of new types of metadata in the context of an Intelligent Data Management System (IDMS), which may also include record and intent of business questions, past dataset access, linked pipelines, and data orchestration, for example.

Among other things, outcome driven data exploration methods and processes may capture how a user intends to use the data they are querying, and may then map the end use case identified by the user to known pipelines and datasets that have been utilized in relation to semantically similar questions to solve problems previously. As well, suggestion engines may be improved through the ongoing monitoring and ranking of dataset selection and relevance. Embodiments of the invention may thus be able to guide the user in the exploration of data, resulting in new opportunities for insight and reduce the time-to-value for dataset discovery and selection. Embodiments may also pre-stage the datasets, through the use of caching for example, that the user may be looking for, where such pre-staging may be based on a stated outcome or prior actions of the user, and deliver those pre-staged datasets faster and more interactively as compared with, for example, reading those same datasets from data stores, which may be remote.

In more detail, businesses often use their data as a competitive advantage. For example, corporate data such as financial data, technical data, market data, and customer data, for example, may be used to reduce operational costs, improve technology, increase revenue and market share, and even predict behavior. It is essential for organizations to have full access to all data content on a continual and reliable basis, and to be able to understand the relative context of the data. Just as critical for organizations is to accelerate the transformation of data into business value and make those highly valuable insights widely visible across the organization for users who may need them.

As noted earlier, current methods of enabling business users to access and discover data is limited to the ability to search on known labels or tags and require the business user to be fully aware of the probable categorization of data. This is inefficient, and may be not particularly effective, and can result in the loss of data exploration opportunities.

Thus, example embodiments may improve the ways in which a user can discover datasets that are well suited to the needs of the user. Some embodiments of the invention may track new forms of 'metadata' related to all data that is accessible or known to the IDMS. Accordingly, example embodiments may enable more meaningful dataset exploration and selection based on new types of metadata gathered to create context for, among other things: organizational business questions; outcome-driven simulations (for example, simulate a certain business strategy, check the outcome, adjust as needed); dataset access patterns; orchestration behavior; security/access rights; and, deployed pipelines metadata.

Thus, at a basic level, at least some example embodiments enable users to input, as part of a query or as the entire query, the question or problem the user is trying to solve. Put another way, example embodiments may use one or more questions, or intended outcome(s), posed by the user as a data exploration method. As well, the user may be able to see all other questions that have been asked or solved by their organization, possibly ordered by degree of relevance to the question posed by the user. Further, the user may also be able to see what datasets and pipelines were used to solve the question or problem, as well as any insights produced by the pipeline execution. Thus, example embodiments embrace new ways of looking for, and at, datasets, pipelines, and data science in general. As such, example embodiments may address and resolve various shortcomings in existing technologies. Some of such shortcomings are briefly addressed below.

One present shortcoming in the data science field is that data scientists must often spend an inordinate amount of time in trying to find datasets that are meaningful. Conventional data management platforms may include functionality such as data discovery, inventory, and integration. These are typically direct connections to known data lakes, storage devices, or other data hosts. Typical solutions provide access to data that is manually or automatically labeled data as a 'Set.' Thus, in such conventional approaches, data is only discoverable by the label associated with it, and the label does not include any context. As a result, the user is unable to query or explore data of relevance based on the type of problem a user is trying to explore. Moreover, the user has little recourse if the data should be incorrectly or inaccurately labeled and, in fact, the user may not even be aware that data is in correctly labeled.

Another concern with conventional approaches, and which may be resolved by some embodiments of the invention, is that datasets may be difficult to navigate without context. Particularly, current result sets are typically organized or ordered by labels, or size. There is little context of relevance to the problem that the user is trying to solve.

As a final example of problems that may be addressed by some embodiments of the invention, behavioral learning gained from watching the interactions of a particular user with the same, or similar, dataset cannot be easily packaged and incorporated into a similar class of the interactions of multiple users with the same dataset. That is, conventional approaches do not provide the ability to use the knowledge gained from observing and capturing the actions of one user with respect to a dataset to dramatically improve the user experience of other users, whether with that dataset or another dataset.

With reference now to FIG. 1, details are provided concerning an example overall scheme 100 that may be employed in some embodiments. The scheme 100 may include an AI (artificial intelligence) powered knowledge base 102 that may be employed by users to formulate business intent through business questions. In more detail, the knowledge base 102 may codify business intent, that is, how the user intends to use the data, store the business intent alongside a data management system, and then use the business intent as part of an IDMS. Depending upon the embodiment, the business intent may be created by way of, and subsequently accompanied by, a set of business questions used to formulate the intent. By capturing, such as in the knowledge database 102, user responses to the business questions, and using those responses as a basis for determining the intent of the user, that is, how the user intends to use the data they are querying to benefit the business, a set of features, such as smart orchestration for example, may be enabled. The business questions, user responses, and business intent, may be combined with a variety of other metadata to offer various data management benefits. Such metadata may include, for example, a history of past access to the data, and data pipelines that may be related or otherwise linked to a data pipeline employed by the user.

At least some of the information, data, and metadata in the knowledge base 102 may be contributed by one or more users 104. Such information, data, and metadata may comprise, in addition to the items noted above, query histories of one or more users, identification of the datasets that were generated in response to queries, and relationships between and among query histories, user intent, identified datasets, and business questions.

In operation, a business user 106 may (1) either posit a new question or problem, or select from the knowledge base 102 a question that has already been addressed and is similar identical to the question the user is trying to answer. The knowledge base 102 may respond with one or more datasets responsive to the question posed by the business user 106, and the business user 106 may then (2) download the dataset(s) responsive to the question or problem that the business user 106 is trying to answer. The business user 106 and/or other personnel may then (3) produce analytics that show how the data and its use would be of value to the business.

It will be apparent that as the knowledge base 102 grows, better focused business questions may be generated and business intent more clearly determined. As well, datasets generated in response to business intent may improve in relevance. Further, datasets may be generated relatively more quickly based on refinements in business questions and business intent, and based on query histories and datasets previously generated.

It is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

B. General Aspects of Some Example Embodiments

It was noted earlier that, among other things, embodiments of the invention may implement outcome driven data exploration for the discovery of meaningful datasets based on a problem that needs to be solved. To this end, embodiments of the invention may track various forms of metadata related to data that is accessible or known to an IDMS. Such metadata may provide context for various applications, such as organizational business questions, outcome-driven simulations (for example, simulate a certain business strategy, check the outcome, adjust as needed), dataset access patterns, orchestration behavior, security/access rights, and, deployed pipelines metadata.

Figure 2:
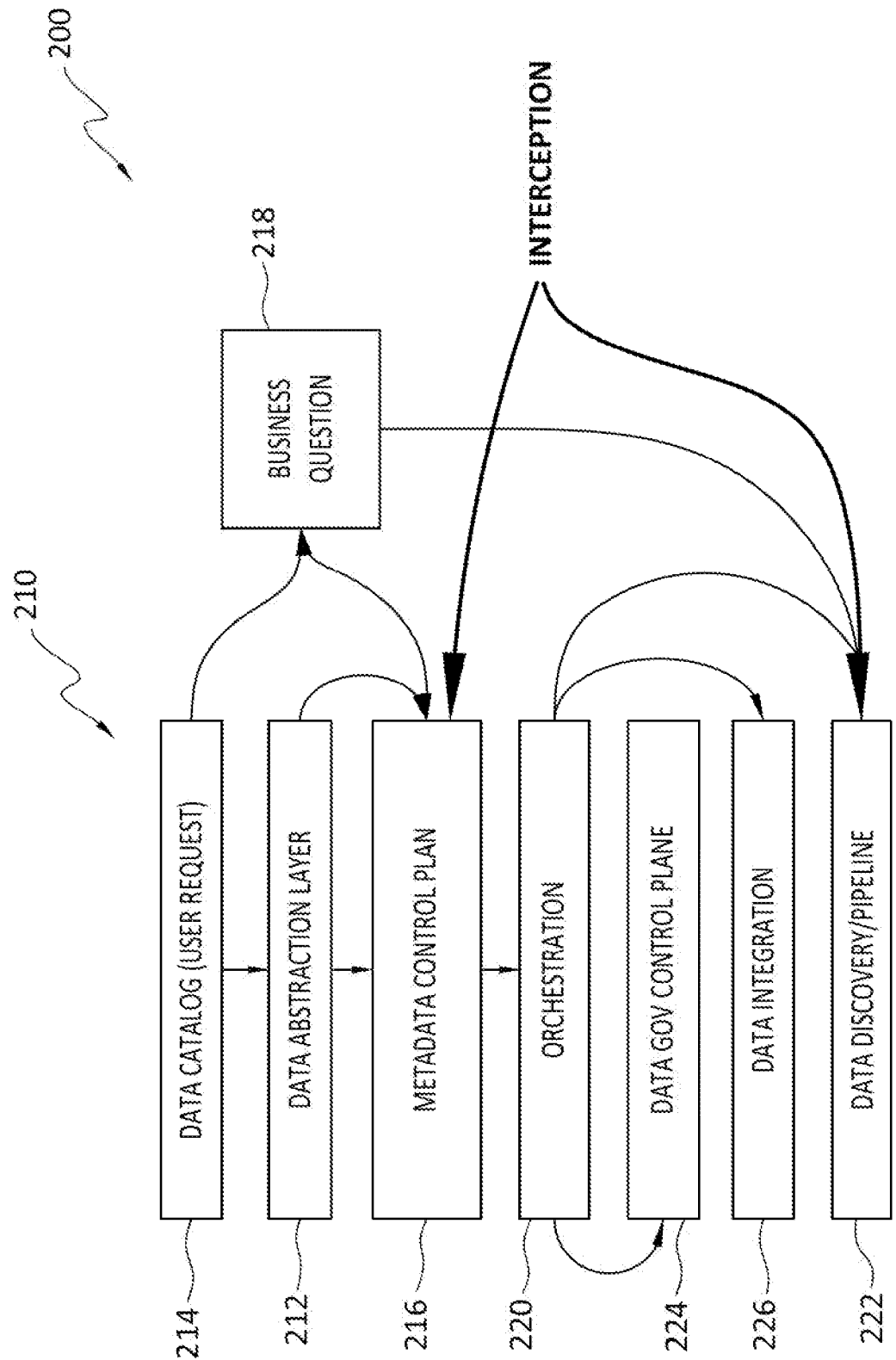
FIG. 2 discloses aspects of an example pipeline architecture according to some embodiments.

With reference now to the example scheme 200 of FIG. 2, the foregoing and other operations may be implemented in part, or in whole, through the use of a data pipeline architecture 210. The data pipeline architecture 210 may take the form of a functional stack, although that is not necessarily required. The data pipeline architecture 210 may include a data abstraction layer 212 which may perform a variety of different functions.

In general, the data abstraction layer 212 may serve as an interception layer positioned between a data catalog 214, which may include an index of data requested by a user, and a metadata control plane 216. Thus configured and located, the data abstraction layer 212 may intercept and/or act upon communications between a user and one or more elements of a data management system. For example, the data abstraction layer 212 may be used by the data catalog 214 to convey a user dataset request. As well, the data abstraction layer 212 may capture datasets generated and returned in response to a user query.

Further, the data abstraction layer may capture one or more business questions 218, which may be generated by one or more elements of a data management system, such as may be used to determine a business intent of a user. One or more business questions 218 may be generated based on input received as part of a user request, and one or more of the business questions may be provided as an input to the metadata control plane.

Another possible function of the data abstraction layer 212 is to capture dataset selections made by a user. That is, the data abstraction layer 212 may receive, log, and store, user selections of datasets. These dataset selections may be employed as historical data for future processes such as, for example, creation of business questions, determinations of user intent, and dataset generation. Embodiments of the data abstraction layer 212 may also be used to capture information concerning dataset browsing by a user, that is, for example, information about datasets that the user has browsed. This information may be used, for example, to return datasets, which may have been cached, that are identified by the data management systems as possibly relevant to a question posed by the user. As a final example, the data abstraction layer 212 may serve to return new dataset suggestions, that is, suggestions as to datasets that may possibly be responsive to a user query, based on an outcome such as how well a prior dataset did, or did not, fulfill the business intent of a user.

With continued reference to FIG. 2, embodiments of a metadata control plane 216 may perform a variety of functions as well. For example, the metadata control plane 216 may be used by an orchestrator, or data orchestration module 220 performing an orchestration process, to define data of a dataset created and returned in response to a user query. As another example, the metadata control plane 216 may compile the content of datasets to be returned to the user based on requests for data that has one or more specific labels. Further, the metadata control plane 216 may store a comparison of one or more business questions, and/or business intent, to one or more datasets and/or data types returned to a user in response to a query based on those business questions and/or business intent. As another example, the metadata control plane may compile a comparison of such business questions, and/or business intent, to one or more datasets and/or data types returned to a user in response to a query based on those business questions and/or business intent. A compilation process performed by the metadata control plane 216 may additionally, or alternatively, include compiling a comparison of business questions, and/or business intent, to one or more data pipelines 222. Note that as used herein, a 'data science pipeline' or simply 'data pipeline' or 'pipeline,' embraces, but is not necessarily limited to, an overall step by step process configured for obtaining, cleaning, visualizing, modeling, and interpreting data within, for example, a business, business unit, or group. The term 'pipeline' may also embrace the creation and/or use of an automated process, such as with code for example, to obtain data (a 'data pipeline') or process data (a 'machine learning pipeline'). As a final example, a metadata control plane 216 may record end user actions, such as with respect to a dataset created and returned to the user in response to a user query, and use information about the recorded actions as an input to drive a data exploration service. Thus, for example, if the user employs a dataset to solve a particular problem, the metadata control plane 216 may record such usage, and the associated problem, which can then be used as a suggestion to generate new, and/or find existing, datasets that may be useful to that user and/or other users.

With continued reference to FIG. 2, the functional stack may also include a data governance control plane 224. In general, the data governance control plane 224 may comprise, or implement, a service supplying the data abstraction layer 212 and orchestration layer 220 "right to access" verification for datasets generated in response to a user request.

The data orchestration module 220 may produce, consume, and/or manage, derived data. Derived data may be created, for example, as a result of the application of one or more of the functionalities of the data orchestration module 220. Such functionalities may include, for example, generating and implementing workflows, performing automation, generating and implementing data enhancements, creating data derivatives and data views, performing data tokenization, and creating and implementing app-specific schemas. As shown in FIG. 2, the orchestration module 220 may communicate with, and receive the outputs of, the metadata control plane 216, and may also communicate with the data governance control plan 224, a data integration module 226, and the data pipeline 222. Finally, an example metadata control plane 216 may trigger one or more aspects of an Outcome Driven Data Exploration Service (ODDES). Aspects of an example implementation of an ODDES are discussed below in connection with FIG. 3.

C. Aspects of an Example Outcome Driven Data Exploration Service

Figure 3:
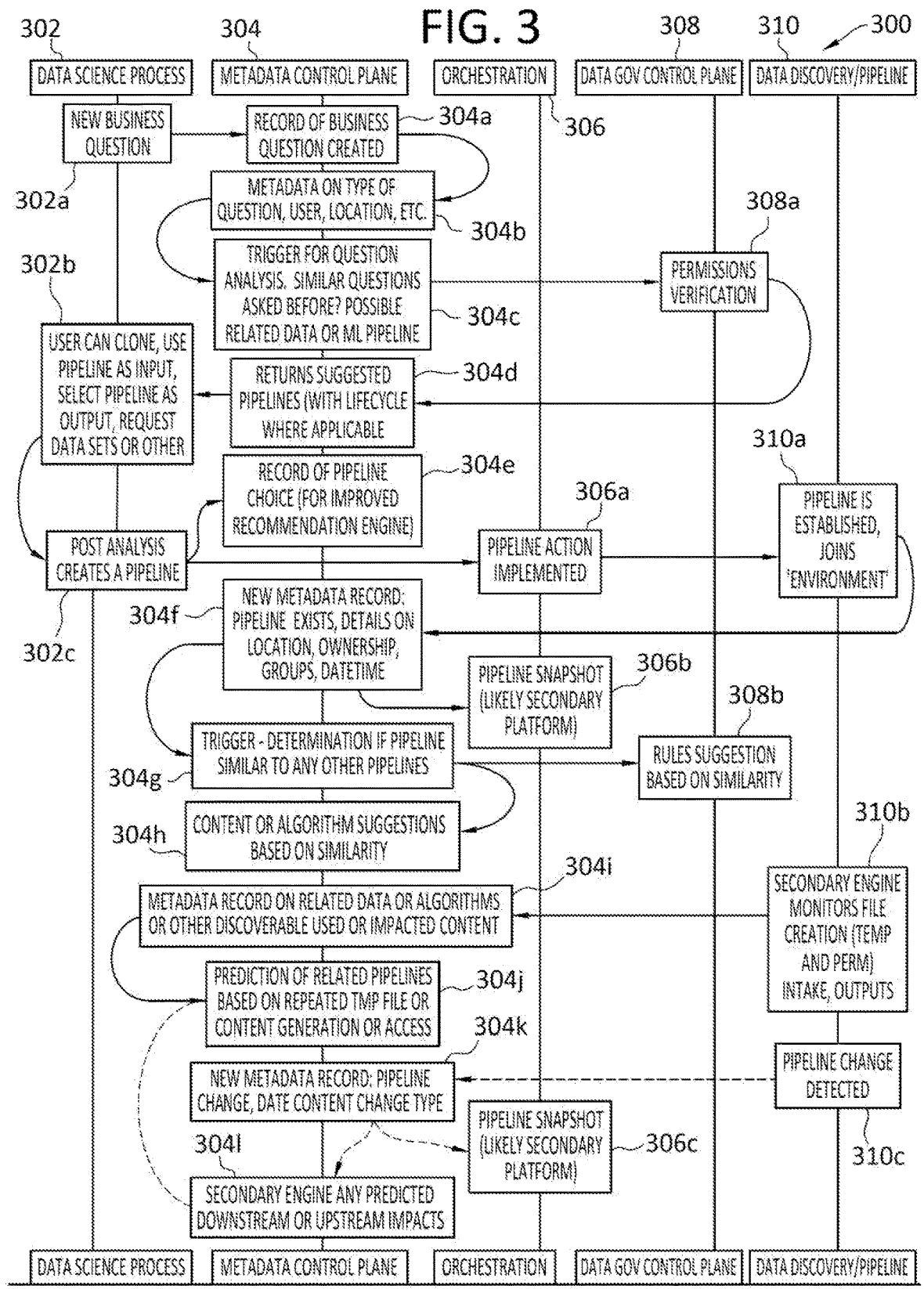
FIG. 3 discloses aspects of an example overall architecture, and associated methods, according to some embodiments.

With continued attention to the example of FIG. 2, attention is directed briefly now to FIG. 3 as well which discloses aspects of an example ODDES 300. While a detailed discussion of FIG. 3 is deferred until later in this disclosure, it is noted here that the ODDES 300 may be considered as being implemented in terms of functions and operations performed by various components of an example architecture such as, but not limited to, the example scheme 200 disclosed in FIG. 2. Such components may include, but are not limited to, a data science process 302 and associated computing modules, a metadata control plane 304, an orchestration module 306, a data governance control plane 308, and data discovery/pipeline module and processes 310. Any of the modules, processes, or operations, of FIG. 2 not explicitly shown in FIG. 3 may nonetheless be included as part of the example ODDES 300 such as, for example, the data abstraction layer 212. Following is a discussion of aspects of example functions and operations of elements of an ODDES, after which the example of FIG. 3 will be discussed in detail.

C.1 Example ODDES Triggers and Associated Operations

Operation of any of the functions and operations of an ODDES, such as the example ODDES 300, may be triggered by various inputs and operations. Thus, for example, an ODDES may be triggered by incoming data requests from users such as data scientists. As used herein, a 'data request' is broad in scope and as such may embrace, by way of illustration and not limitation, one or more requests for data where any one or more of the requests includes one or more specified labels, datasets, dataset identifiers, business questions, responses to business questions, and/or, one or more business intents generated based on responses to business questions. In response to such data requests, the ODDES may perform relative comparisons of any elements of the data requests to any of the elements of the other data requests. For example, one such comparison may involve a comparison of incoming business questions and/or their respective answers to all recorded business questions and/or their respective answers. The comparison may be performed in the context of a single user, such as the user that made the request, or the comparison may be performed across multiple users so that, for example, the incoming business questions from a user may be compared to business questions received from other users.

Based on the comparison(s) performed, the ODDES may generate and return, such as to a user for example, various information and data concerning the comparison. For example, the ODDES may return a ranked similarity of relatedness of other business questions to the business question on which the comparison was based, that is, the list of other business questions may be ranked according to their relative similarity to the question to which those other business questions were being compared. This ranking can be accomplished through any number of NLP (Natural Language Processing) or other comparison engines. In this particular example, the use of semantic categories and distance ranking may provide particularly useful results.

At least some embodiments are thus distinguishable from, for example, Boolean-based inquiries, which require a specific syntax to be employed, and do not allow for the use of natural language inquiries or the flexibility that natural language inquiries enable. As well, a certain level of skill and experience may be required to formulate a Boolean inquiry in order to receive useful results back. In contrast, embodiments of the invention may require no special skill or experience on the part of the user with respect to formulation of questions to which the user seeks a responsive dataset. Rather, the user of example embodiments may simply enter a question, or questions, in natural language form.

When a list of ranked items, such as business questions for example, is returned by the ODDES, those items may be ranked according to their relative similarity to the item to which they are being compared. Thus, some items of the list may be relatively more related, or relatively more similar, to the compared item than other items in the list. Thus, criteria may be established and employed to filter out items whose relatedness does not meet some specified threshold. The retained items may be identified, for example, as being relatively related, as their relative relatedness to the compared item meets or exceeds some threshold. The threshold may, but need not, be expressed as a numerical value so that, for example, an item from the list may have a relatedness of 80 percent to the compared item, and items whose relatedness is below 60 percent may be filtered out. As noted earlier, relatedness may be determined, for example, based on the strength of a semantic correlation between a list item and the compared item. Any other criteria for determining relatedness may be employed however.

In the specific case of a business request, a listed item may be referred to as a Relatively Related Business Question (RRBQ) if that item meets or exceeds some relatedness threshold. For each relatively related business question (RRBQ), the ODDES may returns ranked relatedness of datasets, that is, a list of datasets used to explore or solve this RRBQ), and return a ranked similarity of relatedness of pipelines used in deployment of solutions to this RRBQ.

As noted above, the instantiation and performance one or more processes and operations of an ODDES may be triggered by various events and operations. Another example of a triggering event for an ODDES is a dataset access request such as may be received from a user who wishes to access a particular dataset, or datasets. In response to a dataset access request, an ODDES may perform a comparison, such as a relative relationship comparison, between one or more datasets currently selected by a user to all known datasets along the metadata lines of RRBQ, dataset labels, related pipelines, and/or, ownership of the dataset. Based on this example comparison, the ODDES may return a ranked similarity of dataset along selected relationship exploration, that is, a list of datasets ranked according to their relative similarity to the requested dataset(s). The processes used to identify, compare, and rank, the similar datasets may be considered as elements of a data exploration process which may include additional, or alternative, elements as well.

As a further example, the instantiation and performance one or more processes and operations of an ODDES may be triggered by the deployment of a new pipeline. To illustrate, deployment of a new pipeline, or modified pipeline, may trigger the ODDES to perform a relative comparison of known business questions that are related to the pipeline deployment. As in other example comparison processes disclosed herein, the business questions may be ranked according to their relative relatedness to the deployed pipeline. Business questions that are deemed to be sufficiently related to the deployed pipeline may then be presented to a user who may then answer the questions so as to provide insight to the data management system as to the business intent of the user.

It is noted that the example information received, processed, and/or generated by, the ODDES may be in addition to secondary source data and metadata that may be used in the operations of a data management system, such as the example operations disclosed herein. Such secondary source data may include, for example, data labels, and other example processes that may be used in connection with example embodiments may include correlative data discovery techniques such as semantic correlation.

C.2 Example ODDES Operations

Using various metadata, examples of which are disclosed herein, relative values or relatedness may be assigned to one or more existing datasets, and/or, used to create one or more new datasets, responsive to a user request. Thus, for example, the user may access a data catalog and request a dataset to solve the problem: "Which Program should the research team invest additional resources into?" Additionally, the user may, for example, specify one or more data labels such as 'Revenue' or 'Sales Forecasts' as part of the dataset request.

A data abstraction layer may then capture the label(s) identified in the request, and may also capture the question or problem identified in the dataset request and to which the user requires a solution. Using the captured information, data, and/or, metadata, the data abstraction layer may then trigger operation of the ODDES. As noted elsewhere herein, triggered operations of an ODDES may include performance of a text or context-based comparison of business question against all other captured questions or problems identified by one or more users. The captured question may be parsed and/or otherwise analyzed, such as by NLP for example, to identify particular words, phrases, and/or other elements, that can be used to generate datasets responsive to the request.

One example comparison may be performed using a simplified semantic correlation for text content. For example, a user request may include a question such as "Predict Marketing Investment By Product Line." This request may result in the return of a list of questions, possibly posed by other users, that may be ranked as similar to the request based on the words in the request 'Invest' and 'Product.' Thus, such questions might each be assigned a ranking of +100. As another example, the same, or another, user request may include the question or problem "Resource Cost Estimation Based On Current Inflation?" In this example, the request and resulting comparison may cause the return of a list of questions that may be ranked as similar to the initial request based on the words in the request 'Cost' and 'Investment,' but if the question type is unique, for example, the questions in the returned list may receive a similarity category ranking of only +20, for example.

In some embodiments, it may be the case that larger the number of captured questions and context and detail, the more improved the ranking of the questions returned in the list may be. That is, the question rankings may more accurately reflect reality if a relatively large number of questions, context, and detail, were specified in the dataset request(s) that were the basis for the generation of those rankings. Note that this may be an opportunity for secondary system integration, where a business question, such as the examples noted above, may also provide a link to Confluence (e.g., https://www.atlassian.com/software/confluence) or some other tracking system to generate semantic context and improve results.

As explained above, the specification, in a dataset request, of one or more questions may trigger the generation, and presentation to a user, by the ODDES of a multi-view ranked list of other questions that have been asked that are of a similar category based on a comparison method such as that noted above in the "Predict Marketing Investment By Product Line" and "Resource Cost Estimation Based On Current Inflation?" question examples. After the business questions have been compared and evaluated, a secondary series of triggers may be set off by the ODDES, or another entity, which may result in the return, to the user and/or others, one or more datasets responsive to the user question(s).

The responsive datasets may be selected and ranked according to various criteria. An example of such a selection and ranking process, and algorithm, may be configured as follows:

1. For each inquiry, return the dataset that the end user selected -LAST-, provide this with the highest ranking (e.g. +5);
2. Then return the list of other datasets that were also access, set to lower ranking (e.g. +2) secondary relationships for datasets selected after the initial dataset was tried;
3. For each dataset that was ultimately selected, regardless of the question, return a list of other datasets that were used or were of interest for other non-related questions (ranked at +0.5); and,
4. If any datasets were marked as "bad" or "do not use" apply a strong negative ranking to such datasets.

Datasets satisfying these criteria may then be presented to the user for browsing and selection.

In addition, or as an alternative, to returning the responsive datasets, the ODDES may return a ranked list of pipelines in response to a question, or questions, included in a user dataset request. For example, and possibly using the same methodology disclosed herein for identifying and returning related datasets, the ODDES may return a ranked list of pipelines known to have been implemented against a business question, as well as returning any sufficiently related pipelines, and any business insights associated with those related pipelines. Additionally, or alternatively, the ODDES may return, using relationship mapping as discussed elsewhere herein, a group of pipelines that are configured to work together in a topology. This will enable the capability, with secondary application integration, to allow the user select multiple pipelines to clone or "string together" to construct an "uber" pipeline(s) for use in their new project. Thus, the user may not be constrained to the use of only a single pipeline.

As well, if the user question includes one or more data labels, in addition to one or more questions, examples of which are addressed above, the metadata control plane may return both (a) the exact-match label dataset results and (b) the ODDES discovered results. These different results may be labeled as such when presented to the user so the user is made aware of how the results were generated. A list of ODDES discovered may take various results. In one example, such a list may take the following form:

```
{Question related (score +500)
    Selected Dataset (score +100)
        Correlated datasets (score (+25))
        Corelated dataset (score +5)
    Selected Dataset (score +50)
        Correlated Dataset (score +5)
    Pipeline deployed (Score +100)
        Secondary correlation (score +15)
        Secondary pipelines correlated (score +2)
    Question related (score +300)
        ... }
```

The user activity in the business question, dataset and pipeline exploration may be monitored and recorded as new metadata. Downloaded/cloned datasets and pipelines may be noted in the metadata control plane as "positive correlation confirmation." This increases the correlation score for future recommendations based on similar questions. While this example shows additive results ranking, any number of calculations could be used to determine relevance based on the new metadata.

In this example, RRBQs with a score of 100 may be shown to a user before RRBQs with a score of 90. Datasets that are part of a RRBQ with a ranking of 100 may be shown before datasets that are related to a question with a ranking of +90. As well, tree views may be presented to the user that include weighted clustering views for datasets, questions, and pipelines. For example, similar datasets may be clustered together in such a view, and such datasets may be weighted by their relative similarity to another dataset or question, for example. The end user may explore both the datasets that are labeled "Sales Forecasts," as well as any datasets found by question correlation. The user may be able to discover the datasets and pipelines that were used to determine marketing investments by product line, and then build on those datasets and pipelines, reducing the time-to-business value. Advantageously then, the user may have access to content that they can use to start the project, such as pipelines and datasets already groomed by prior teams.

In view of this disclosure, various other useful aspects of embodiments of the invention are evident. For example, some embodiments use a relationship ranking and scoring system as part of methods of returning dataset relationships, and thus enabling user browsing of data by probable relevance based on past inquiry. Using such ranking methods and ranking, a user can perform data exploration around the ranking of any of the object types such as question, dataset, or pipeline, for example, and/or attributes on the types such as label commonality, owner, or access data, for example.

As another example, some embodiments may serve new views, information, and suggested datasets, to a user for exploration without requiring the user to specify or use exact-match data labels. Ranking of datasets, business questions, and other elements relating to user queries, may be used to create clustered views for object or asset types with values over a certain score, between scores, within a relationship distance (e.g., 2nd degree relationships or higher), and on other bases. In this way, embodiments may provide the use with an increase in the opportunities for discovery of datasets that may reduce time-to-value through interactive exploration undertaken by the user.

As a final example, embodiments of the invention may provide for guided or assisted data exploration based on similar interactions with data by same class of users. In this example approach, the user may jumpstart their data exploration journey by being presented with datasets or outcomes selected by similar users in prior interactions with the system and/or data. Embodiments may also recommend sub (component) queries used in combination with other queries which were previously successful in producing datasets adequate to solve the problem identified by the user. This approach may reduce the time-to-value for data exploration through an increase in discoverable data, questions, pipelines and more.

C.3 Example ODDES Environment and Associated Operations

With reference next to FIG. 3, details are provided concerning various methods and operations that may be performed in connection with a particular embodiment of an ODDES denoted at 300. As indicated earlier herein, the ODDES 300 may comprise, or at least interact with, various components such as, but not limited to, a data science process 302 and associated computing modules, a metadata control plane 304, an orchestration module 306, a data governance control plane 308, and data discovery/pipeline module and processes 310. It is noted that while the processes of FIG. 3 are necessarily discussed in an order, the scope of the invention is not so limited and such processes may be performed in various other orders that will be apparent. In some instances, one or more of the processes may be omitted.

As well, it is noted with respect to the example method of FIG. 3 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Any, or all, of the operations and methods disclosed in FIG. 3 may be performed at a data management system which may, or may not, reside or be hosted at a cloud site, user premises, or other location. The data management system may, but need not be, part of a data protection system hosted at a cloud site, a user premises, or other location. The data management system may, or may not, be co-located with one or more users, such as data scientists for example, who may generate and transmit queries or requests for data to the data management system.

Initially, one or more new business questions may be defined 302a by a user and/or by the data management system. The responses provided by the user to the new business questions may be used to define a business intent, that is, the question that the user seeks to answer. In addition, or as an alternative, to definition of a business question 302a, and as shown at 302b, the user may clone one or more prior business questions, use a previously defined pipeline as an input or query, select a pipeline as a desired output, and/or request datasets. Thus, at 302b, the user can identify inputs that may collectively define a query, and the user may also select the desired output(s). In the event that the user selects a pipeline, for example, as an output, the pipeline may be created at 302c after the user query has been run.

As indicated in FIG. 3, various operations performed as elements of the data science process 302 may implicate operations of the other elements of the ODDES 300, such as the metadata control plane 304. For example, creation of a business question 302a may cause the metadata control plane 304 to create a record 304a of that business question. As well, metadata may be extracted 304b from the record that was created at 304a, and such metadata may include, for example, metadata concerning the type of business question (e.g., finance, operations, engineering), the user who created the business question, and a department where the user is located.

The extracted metadata may be used to trigger 304c analysis of the business question. Such analysis may determine, for example, whether similar questions were asked before by the same or other users, whether there may be data related to the business question, and whether there may be a pipeline related to that business question. If such information is available, the data governance control plane 308 may be queried to verify that the user is permitted to access that information. The data governance control plane 308 may perform the verification 308a and, if successful, may signal the metadata control plane 304 to return the suggested pipeline(s) 304d to the user.

Further, when the user selects a pipeline as an input and/or chooses an output in the form of a pipeline, the user choices may be recorded 304e by the metadata control plane 304. The recorded information concerning the pipeline may be used as an input to a recommendation engine which may make use that information to make future recommendations for the user and/or other users.

After a new pipeline is created 302c, the actions included in, or otherwise associated with, that pipeline may be implemented 306a by the orchestration module 306. Further, the pipeline may be joined 310a to the data discovery/pipeline environment 310. As well, a new metadata record may be created 304f that reflects creation of the pipeline. The new metadata record may contain any information concerning the pipeline including, but not limited to, the existence of the pipeline, nature of the pipeline and the function(s) it performs, where the pipeline is located in the data management system topology, the ownership of the pipeline, any business groups the pipeline is associated with, the user that requested creation of the pipeline, and a timestamp indicating when the pipeline was create. The information in the metadata record may be used to create a snapshot 306b of the pipeline, which may be stored and later retrieved for use in handling further user queries.

As well, the metadata record may act as a trigger for the metadata control plane 304 to determine 304g if the pipeline with which the metadata is associated is similar to any other existing pipelines. If the pipeline is similar to any existing pipelines, a suggestion 308b may be made to the data governance control plane 308 that the rules for access to the new pipeline be the same, or similar, to the access rules for the existing similar pipelines. The metadata record may also trigger the generation 304h of dataset and/or pipeline suggestions to the user and/or other users based on the similarity of the new pipeline to existing pipelines.

Further, the metadata record created 304f for the new pipeline may trigger creation 304i of a metadata record for any data related to that pipeline, algorithms related to the pipeline, and/or content used or impacted by the new pipeline or related pipelines. The metadata record may be associated with information, data, and metadata, provided by an engine of the data discovery/pipeline 310 which monitors pipeline operations 310b such as, but not limited to, file creation, both temporary and permanent files, file intake, and data outputs. In this way, the metadata may be linked to data associated with the new pipeline that was created at 302c.

The metadata may also be used as a basis for prediction 304j or identification of pipelines that may be related to the pipelines in connection with which the data associated with the metadata was generated. For example, such predictions 304j may be based on repeated creation of similar temporary files, generation of similar content, and/or repeated access of similar data.

When a new metadata record is created for a new or modified pipeline 304f, the metadata record may reflect 304k, for example, a change to an existing pipeline, a change to a type of data content associated with the pipeline to which the metadata record corresponds, and/or any other changes associated with the pipeline and/or its associated data. In some instances, the changes reflected by the metadata record may be detected 310c by the data discovery/pipeline 310.

As further indicated in FIG. 3, a snapshot may be created 306c of the new or modified pipeline to which the new metadata record applies. Finally, an engine associated with the metadata control plane 304 may generate predictions 304l as to upstream and/or downstream impacts to a pipeline that may result from the creation of a new or modified pipeline. This prediction information may serve as an input to the prediction process at 304j.

It is noted that while the discussion of FIG. 3 is largely concerned with creation of new and modified pipelines, the scope of the invention is not so limited. Rather, and by way of illustration, the methods and processes of FIG. 3 may be applied as well to the creation of new and modified datasets.

It is further noted that, for the purpose of this disclosure, a 'dataset' embraces, but is not necessarily limited to, a collection of information that may correspond to a specific need, question, or problem, identified by a user, such as a data scientist and/or machine. A dataset may be a new dataset, or a modified version of another dataset. The dataset may be generated, for example, in response to, and based upon, a request or query by a user. A dataset may include one or more records. The records may be individual components of the dataset and do not necessarily imply any particular type of content.

As used herein, 'correlation' and its forms embrace, but are not necessarily limited to, "a measure of how strongly one variable depends on another. Consider a hypothetical dataset containing information about professionals in the software industry. We might expect a strong relationship between age and salary, since senior project managers will tend to be paid better than [younger] engineers. On the other hand, there is probably a very weak, if any, relationship between shoe size and salary. Correlations can be positive or negative. Our age and salary example is a case of positive correlation. Individuals with a higher age would also tend to have a higher salary. An example of negative correlation might be age compared to outstanding student loan debt: typically older people will have more of their student loans paid off . . . " (see, e.g., https://blog.bigml.com/2015/09/21/looking-for-connections-in-your-data-correlation-coefficients/).

Finally, 'semantic correlation' embraces, but is not necessarily limited to, text analyses that identify relatedness between units of language, such as words, clauses, or sentences for example, and therefore records. Identification of relatedness may be achieved using statistical approaches such as a vector space model to correlate contexts from a suitable text corpus.

D. Example Use Case

Appendix A to this disclosure, incorporated herein in its entirety by this reference, illustrates aspects of an example use case.

E. Further Example Embodiments

Following are some further example embodiments of the invention. These are presented only by way of example and are not intended to limit the scope of the invention in any way.

Embodiment 1. A method, comprising: receiving a query that recites a particular question for which a user who originated the query needs an answer; parsing the query to identify the question; identifying information that is responsive to the question; and presenting the information to the user in a user-selectable form.

Embodiment 2. The method as recited in embodiment 1, wherein the information presented to the user comprises a dataset and/or a pipeline.

Embodiment 3. The method as recited in any of embodiments 1-2, further comprising presenting to the user, prior to receipt of the query: information that identifies a question similar to the question posed by the user; and any datasets and pipelines that were used to resolve the similar question.

Embodiment 4. The method as recited in any of embodiments 1-3, wherein the query comprises a business intent generated based on one or more business questions provided to, and answered by, the user, and the business intent indicates a way in which the user intends to use a dataset or pipeline received by the user in response to the query.

Embodiment 5. The method as recited in any of embodiments 1-4, wherein the query specifies a pipeline that the user requires as an output.

Embodiment 6. The method as recited in any of embodiments 1-5, further comprising presenting, to the user, insights generated as a result of a pipeline execution process.

Embodiment 7. The method as recited in any of embodiments 1-6, wherein the query does not include any data labels, and identification of the information responsive to the query does not involve the use of data labels.

Embodiment 8. The method as recited in any of embodiments 1-7, further comprising comparing the question with one or more other questions, and the information presented to the user comprises a list of the other questions ranked according to their respective similarity to the question, and the information presented to the user further comprises a respective dataset and/or pipeline corresponding to each of the questions in the list.

Embodiment 9. The method as recited in any of embodiments 1-8, further comprising recording metadata related to the question and to the information presented to the user.

Embodiment 10. The method as recited in embodiment 9, wherein the metadata comprises any one or more of dataset access patterns, data security/access rights, metadata concerning a business question, metadata concerning a business intent, and dataset identification information.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
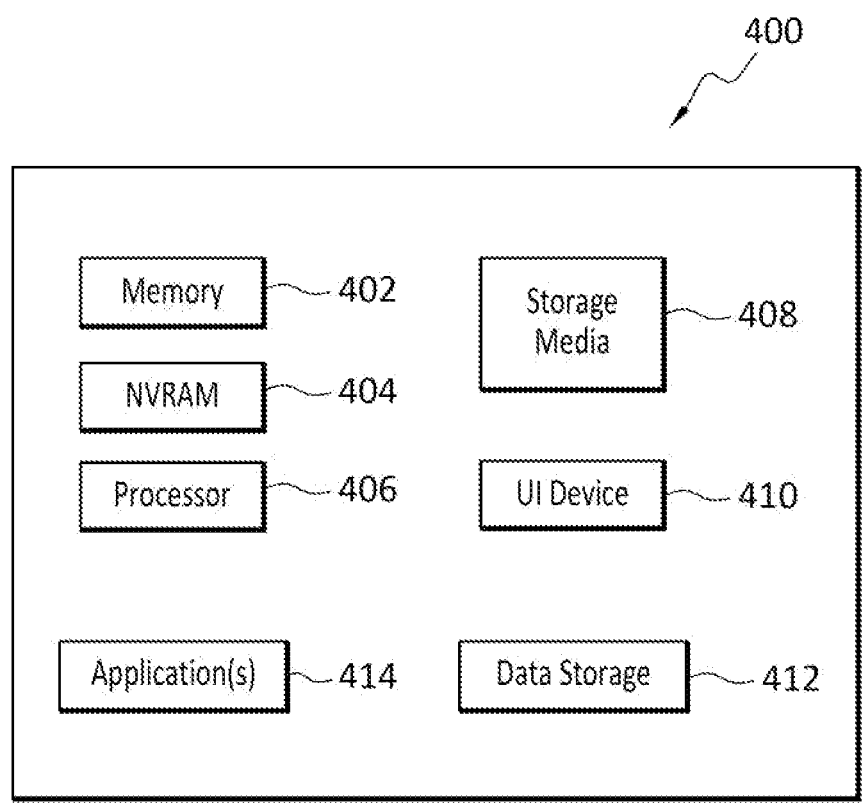
FIG. 4 discloses aspects of an example computing entity operable to perform any of the disclosed methods and processes.

With reference briefly now to FIG. 4, any one or more of the entities disclosed, or implied, by FIGS. 1-3 and Appendix A and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    receiving, by a data abstraction layer of a data pipeline architecture, a query that recites a particular question which identifies a problem that a user who originated the query needs to resolve;
    creating, by a metadata control plane that is operable to communicate with the data abstraction layer, a record of the question;
    extracting, by the metadata control plane from the record, information relating to the question;
    using, by the metadata control plane, extracted metadata to trigger an analysis of the question;
    based on an outcome of the analysis, identifying, by the metadata control plane, information that is relating to the question;
    verifying, by a data governance control plane, if the user is permitted to access the information;
    obtaining, by the metadata control plane from a data catalog by way of the data abstraction layer, the information that is responsive to the question;
    presenting, by the metadata control plane, the information to the user in a user-selectable form; and
    increasing a correlation score of the information selected by the user from the user-selectable form, wherein the correlation score determines whether the information is used, by the metadata control plane, to resolve similar future queries.

2. The method as recited in claim 1, wherein the information presented to the user comprises a dataset and/or a pipeline.

3. The method as recited in claim 1, further comprising presenting to the user, by the metadata control plane, prior to receipt of the query:
    information that identifies a question similar to the question posed by the user; and
    any datasets and pipelines that were used to resolve the similar question.

4. The method as recited in claim 1, wherein the query comprises a business intent generated based on one or more business questions provided to, and answered by, the user, and the business intent indicates a way in which the user intends to use a dataset or pipeline received by the user in response to the query.

5. The method as recited in claim 1, wherein the query specifies a pipeline that the user requires as an output.

6. The method as recited in claim 1, further comprising presenting, to the user by the metadata control plane, insights generated as a result of a pipeline execution process.

7. The method as recited in claim 1, wherein the query does not include any data labels, and identification of the information responsive to the query does not involve the use of data labels.

8. The method as recited in claim 1, further comprising comparing the question with one or more other question, and the information presented to the user comprises a list of the other question ranked according to their respective similarity to the question, and the information presented to the user further comprises a respective dataset and/or pipeline corresponding to each of the question in the list.

9. The method as recited in claim 1, further comprising recording the metadata related to the question and to the information presented to the user.

10. The method as recited in claim 9, wherein the metadata comprises any one or more of dataset access patterns, data security/access rights, metadata concerning a business question, metadata concerning a business intent, and dataset identification information.

11. A non-transitory storage medium having stored therein instructions that are executable by one or more hardware processors to perform operations comprising:
    receiving, by a data abstraction layer of a data pipeline architecture, a query that recites a particular question which identifies a problem that a user who originated the query needs to resolve;
    creating, by a metadata control plane that is operable to communicate with the data abstraction layer, a record of the question;
    extracting, by the metadata control plane from the record, information relating to the question;
    verifying, by a data governance control plane, if the user is permitted to access the information;

using, by the metadata control plane, extracted metadata to trigger an analysis of the question;

based on an outcome of the analysis, identifying, by the metadata control plane, information that is responsive to the question;

obtaining, by the metadata control plane from a data catalog by way of the data abstraction layer, the information that is responsive to the question;

presenting, by the metadata control plane, the information to the user in a user-selectable form; and increasing a correlation score of the information selected by the user from the user-selectable form, wherein the correlation score determines whether the information is used, by the metadata control plane, to resolve similar future queries.

12. The non-transitory storage medium as recited in claim 11, wherein the information presented to the user comprises a dataset and/or a pipeline.

13. The non-transitory storage medium as recited in claim 11, wherein the operations further comprise presenting to the user, by the metadata control plane, prior to receipt of the query:

information that identifies a question similar to the question posed by the user; and any datasets and pipelines that were used to resolve the similar question.

14. The non-transitory storage medium as recited in claim 11, wherein the query comprises a business intent generated based on one or more business questions provided to, and answered by, the user, and the business intent indicates a way in which the user intends to use a dataset or pipeline received by the user in response to the query.

15. The non-transitory storage medium as recited in claim 11, wherein the query specifies a pipeline that the user requires as an output.

16. The non-transitory storage medium as recited in claim 11, wherein the operations further comprise presenting, to the user by the metadata control plane, insights generated as a result of a pipeline execution process.

17. The non-transitory storage medium as recited in claim 11, wherein the query does not include any data labels, and identification of the information responsive to the query does not involve the use of data labels.

18. The non-transitory storage medium as recited in claim 11, wherein the operations further comprise comparing the question with one or more other questions, and the information presented to the user comprises a list of the other questions ranked according to their respective similarity to the question, and the information presented to the user further comprises a respective dataset and/or pipeline corresponding to each of the questions in the list.

19. The non-transitory storage medium as recited in claim 11, further comprising recording the metadata related to the question and to the information presented to the user.

20. The non-transitory storage medium as recited in claim 19, wherein the metadata comprises any one or more of dataset access patterns, data security/access rights, metadata concerning a business question, metadata concerning a business intent, and dataset identification information.

* * * * *